United States Patent
Hummel et al.

(10) Patent No.: US 6,758,533 B1
(45) Date of Patent: Jul. 6, 2004

(54) WHEEL FOR A MOTOR VEHICLE AND A METHOD OF MAKING THE WHEEL

(75) Inventors: Frank Hummel, Eningen (DE); Jens Stach, Heimsheim (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 10/009,592

(22) PCT Filed: May 20, 2000

(86) PCT No.: PCT/EP00/04581

§ 371 (c)(1),
(2), (4) Date: Oct. 25, 2002

(87) PCT Pub. No.: WO00/76785

PCT Pub. Date: Dec. 21, 2000

(30) Foreign Application Priority Data

Jun. 11, 1999 (DE) .......................... 199 26 573

(51) Int. Cl.[7] ................................................ B60B 1/08
(52) U.S. Cl. ................. 301/64.101; 301/65; 264/271.1; 264/318; 164/340; 249/91; 249/160; 425/441; 425/DIG. 58
(58) Field of Search ...................... 301/63.106, 64.101, 301/64.702, 64.704, 64.705, 65, 95.101; 264/271.1, 274, 275, 318; 164/177, 339, 340; 249/91, 160, 161; 425/DIG. 58, 441

(56) References Cited

U.S. PATENT DOCUMENTS

| | | | | |
|---|---|---|---|---|
| 3,253,862 A | | 5/1966 | Watanabe | |
| 3,341,910 A | * | 9/1967 | Hesselholt | |
| 4,995,675 A | * | 2/1991 | Tsai | 301/64.701 |
| 5,249,846 A | * | 10/1993 | Martin et al. | 301/64.701 |
| 5,320,160 A | * | 6/1994 | Kato et al. | 164/305 |
| 5,427,171 A | * | 6/1995 | Prieto | 164/132 |
| 5,538,329 A | * | 7/1996 | Stach | 301/65 |
| 5,626,182 A | * | 5/1997 | Bortoloni | 164/340 |
| 5,896,912 A | * | 4/1999 | Monroe et al. | 164/134 |
| 6,106,075 A | * | 8/2000 | Suenaga | 301/64.101 X |
| 6,254,968 B1 | * | 7/2001 | Scharrenberg | 428/192 |
| 6,325,462 B1 | * | 12/2001 | Hummel et al. | 301/65 |
| 6,428,730 B1 | * | 8/2002 | Nishida | 264/255 |
| 6,431,254 B2 | * | 8/2002 | Dittrich | 164/137 |
| 6,497,459 B2 | * | 12/2002 | Hummel et al. | 301/64.101 |
| 6,530,624 B2 | * | 3/2003 | Stach | 301/65 |

FOREIGN PATENT DOCUMENTS

| | | | |
|---|---|---|---|
| DE | 3543194 | * | 11/1986 |
| DE | 195 01 508 | | 4/1996 |
| DE | 297 23 749 | | 2/1999 |
| DE | 197 54 959 | | 6/1999 |

* cited by examiner

Primary Examiner—Russell D. Stormer
(74) Attorney, Agent, or Firm—Crowell & Moring LLP

(57) ABSTRACT

In a wheel for a motor vehicle, the existing hollow spaces are filled with residual cores. These cores are made of a metallic foam or are of shell-shaped bodies or shell-shaped bodies filled with metallic foam. The cores are arranged in closed and open hollow spaces.

17 Claims, 5 Drawing Sheets

WHEEL FOR A MOTOR VEHICLE AND A METHOD OF MAKING THE WHEEL

BACKGROUND AND SUMMARY OF THE INVENTION

The invention concerns a wheel for a motor vehicle and a process for producing the wheel made of a light metal and produced in a casting process comprising a residual core made of a metallic material and arranged in at least one hollow space of the wheel.

In German Patent Document DE 197 54 959.4, a vehicle wheel is described, which has hollow spaces for weight reduction in which residual cores are arranged. These are placed into the molding tool and encapsulated in casting material. These cores are made either of a metallic foam covered with a skin or of a hollow closed shell. A motor vehicle wheel is also known from German Utility Document DE 297 23 749 U1, which is filled with metallic foam to form a wheel spoke, which is arranged exposing the inner side of the rim spider. Other hollow spaces of the wheel are provided with a residual core of metallic foam, wherefore also the outwardly open metallic foam is arranged in the wheel spoke.

It is an object of the invention to create a vehicle wheel, in particular a vehicle wheel with hollow spokes, which can be produced in a simple manner and has a low weight with an optimal stability.

This object is attained according to the invention via the core being arranged in an area of a rim edge of the wheel in an annular space which is formed by a rim and a rim spider and is open at one side. Other advantageous features are contained in preferred embodiments.

The main advantages obtained with the invention are that the closed hollow spaces as well as the open hollow spaces of the wheel are produced with a residual core. In this way, the core is arranged in the area of a rim edge of the wheel in an annular space open toward one side formed by the rim and a rim spider. For this purpose, according to the invention, a molding tool with sliders is used, which are removably arranged close together in connection to a lower mold. The first slider lying directly beside the lower mold has a recess for a core part, which projects out of the annular space. The second slider seals closed this recess and the annular space.

In this way, it is possible in a simple manner to arrange the core in the annular space of the rim edge so that, after a mechanical processing, a stable rim edge is produced. At the same time, also a casting that can be rolled out to form a rim edge can be produced in the molding tool, which, however, is not absolutely necessary. Rather, also a "ready" rim in its final condition can be produced in the molding tool.

According to the invention, the core can be used in the hollow spaces of a rim with or without hollow spokes. The relevant hollow spaces of the wheel in the area of the hub, in the wheel spoke, as well as in the area of the horn can be provided either all or also only part with a core. Therefore, in a wheel with hollow spokes, the core is necessarily provided in the area of the hub, in the hollow spoke, as well as in the area of the horn, since this makes necessary the fixing in the mold. In a wheel without hollow spokes, it is optionally possible to provide the residual hollow spaces with residual cores.

So that an easy processing of the core prints—which hold the core in the molding tool—becomes possible, the core prints are directed toward the outer design of the wheel. The core prints can also consist of several metal pins, which are arranged distributed and projecting with respect to the surface of the core and form a core layer like a pincushion.

The core in the rim edge has at least one core print, which forms a bored-through receiving bore for a wheel valve and in this way saves one processing work step.

The core can have a contoured or rough surface to improve the form-tight connection with the casting material.

The core can be made of a metallic foam with a surrounding layer or skin or can consist of a metallic or ceramic closed hollow body.

According to the invention, the hollow body can consist of one or several pieces and can be produced through a forming process. The materials of which the hollow bodies can be made are ceramic materials, aluminum alloys, or steel alloys. The hollow body can also be filled with foamable metal to obtain an optimal stability of the hollow body.

The metallic foam body can be made, for example, of an aluminum foam, which is protected against the influences of the casting melt during the casting process. This protective layer can be produced via an oxidation process (anodizing) or via ceramic or spray-coating or immersion or spray coating with adhesive materials.

According to another embodiment of the invention, the wheel can also be made completely of plastic, wherein the hollow spaces are provided with residual cores like in a wheel made of metal.

To provide the wheel produced in the casting process with local reinforcements, metallic or ceramic long fiber elements are arranged at the core or the mold, which are encapsulated.

Exemplary embodiments of the invention are shown in the drawings and are described in the following.

DETAILED DESCRIPTION OF THE DRAWINGS

The wheel 1 has a core 6, 7, 8, 9 in an annular channel 2 or in the hollow spaces 3, 4, and 5 which remains after the casting process. These cores can be made of a metallic foam with a surrounding skin or layer or can be hollow bodies of one or several shells or of a hollow body filled with metallic foam.

Figure 1:
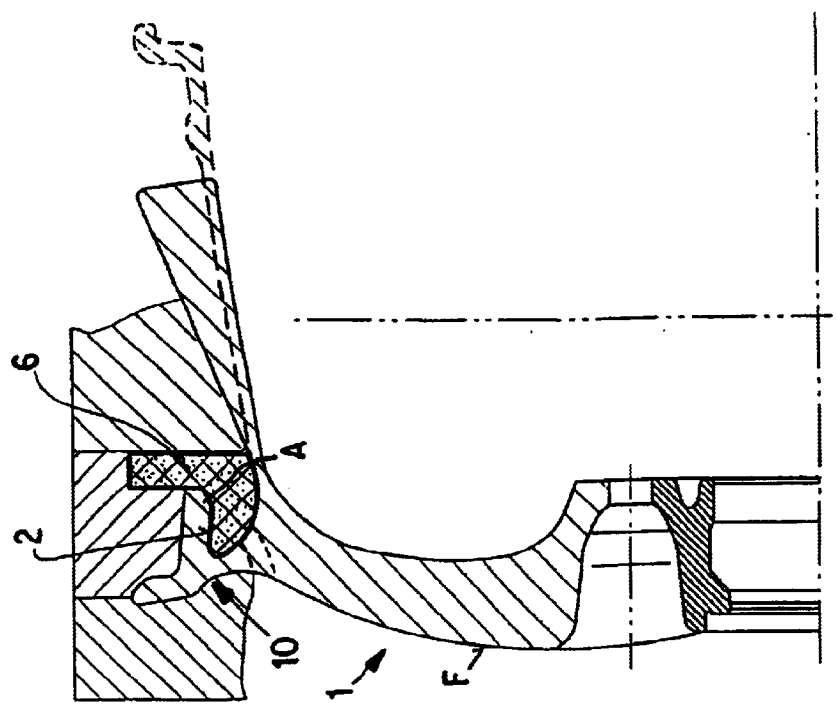
FIG. 1 shows a section of a wheel with a residual core arranged in the rim edge in an open annular space as well as a molding tool with two sliders.

In FIG. 1, the core 6 is arranged in the rim edge 10 in an annular channel or space 2, which is open at one side. The annular space 2 is arranged between the rim 15 and a collar ring (also referred to as a "bead seat") A at the rim edge 10. The annular space 2 is open toward the rear of the rim spider F and is arranged adjacent to the rim. To arrange this core 6, the molding tool has a molding tool lower part 11, two radial sliders 12, 13, and a molding tool upper part 14 or 14'. The core 6 is turned off after the casting process in correspondence with the end contour of the rim.

Figure 2:
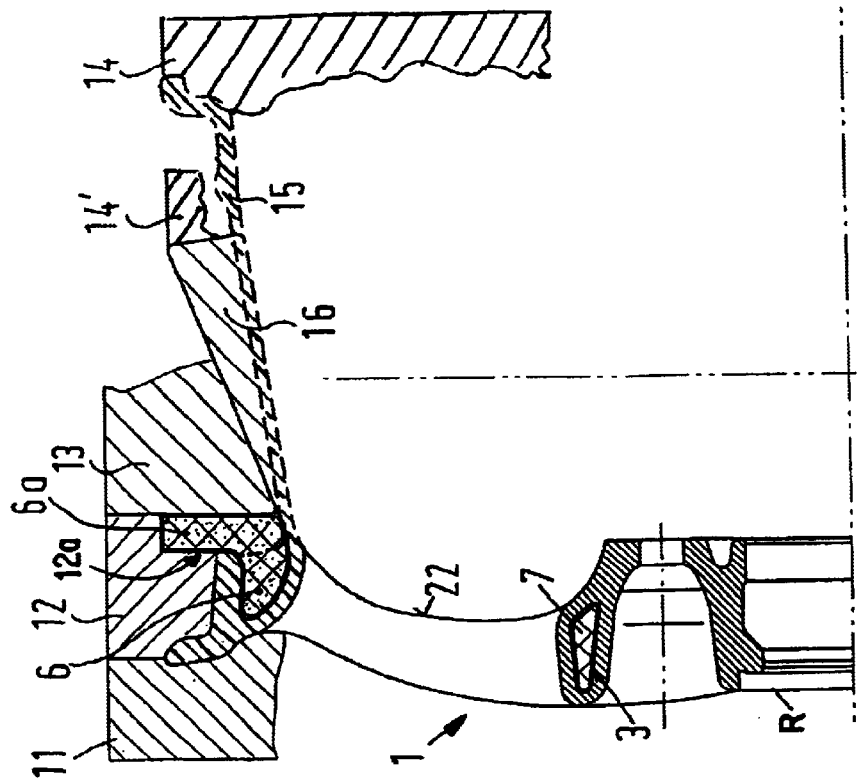
FIG. 2 shows a section of a wheel with a residual core in the rim edge and in the area of the hub.

The rim 15 of the wheel 1 can be cast in the molding tool upper part 14 or 14' either as a casting which can be rolled out 16 or a "ready" rim 15, which is shown in more detail in FIGS. 1 and 2.

The area of the rim is produced with a hot or cold rolling out or in a flow-forming process to obtain a forged-like highly strong and/or highly ductile metallic structure. To reduce the thermal and mechanical stress of the core during the casting process, different casting processes, such as "multi-injection low-pressure casting" (several casting points), can be used to produce the wheel parts. "Pressure casting" and its variations (for example, Vakural pressure casting), "squeeze casting," and their variants (for example, indirect squeeze casting), "thixo casting," and its variants can be utilized.

Figure 3:
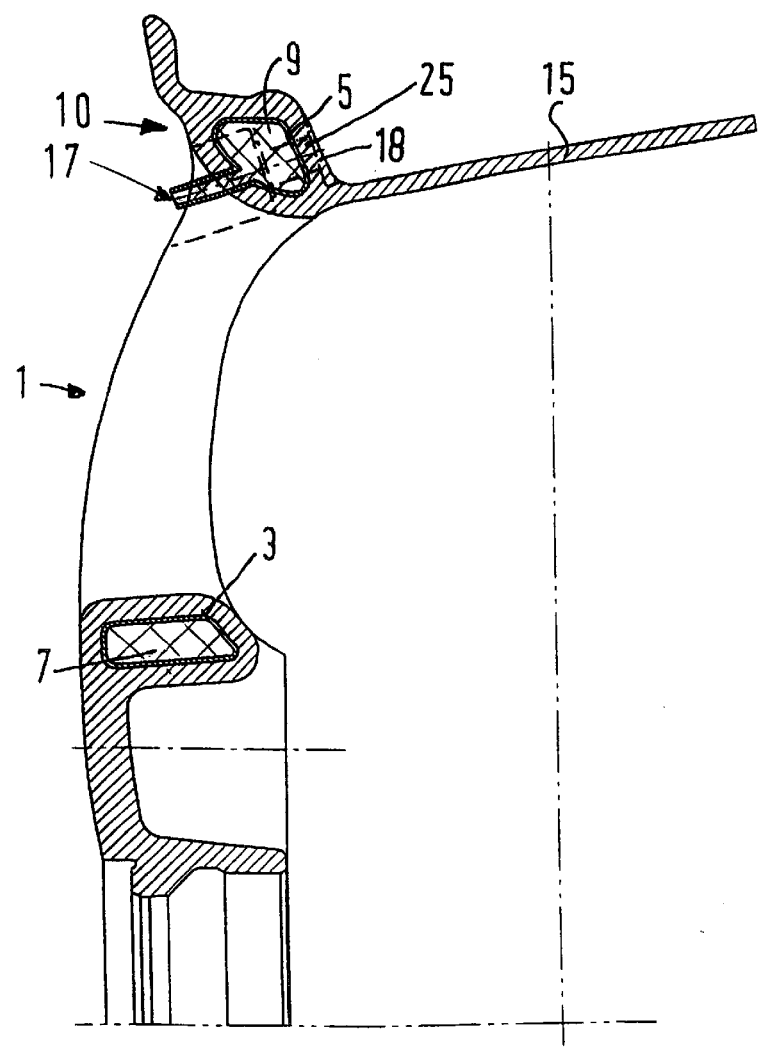
FIG. 3 shows a section of a wheel with a core arranged in the rim edge and a closed hollow space.
Figure 6:
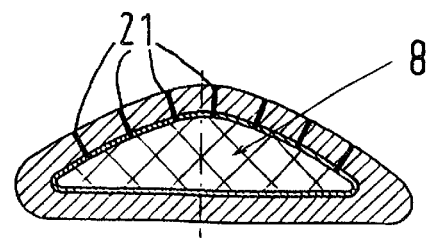
FIG. 6 shows a horizontal section through one wheel spoke with needle pins held by the core.

In FIG. 3, inter alia, a closed hollow space 5 of the wheel 1 with a core 9 in the rim edge 10 is shown. The latter is held with at least one core print 17 in the molding tool. A receiving bore 25 for a tire valve is obtained through a boring of this core print 17 and the wall 18 of the rim 15 lying behind it.

Figure 4:
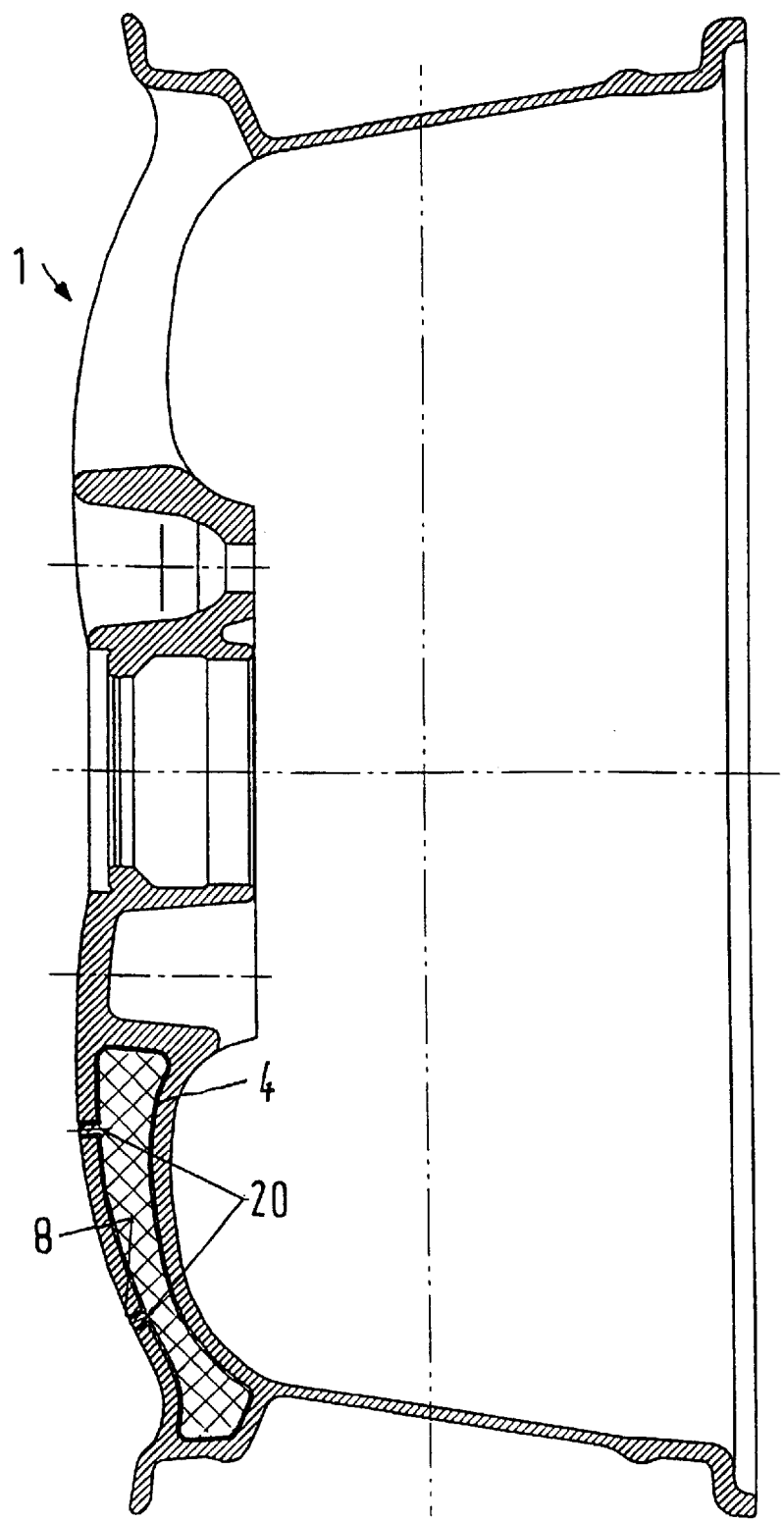
FIG. 4 shows a section of a wheel with a core arranged in a hollow spoke in the area of the hub and in the rim edge, as well as outwardly directed core prints.
Figure 7:
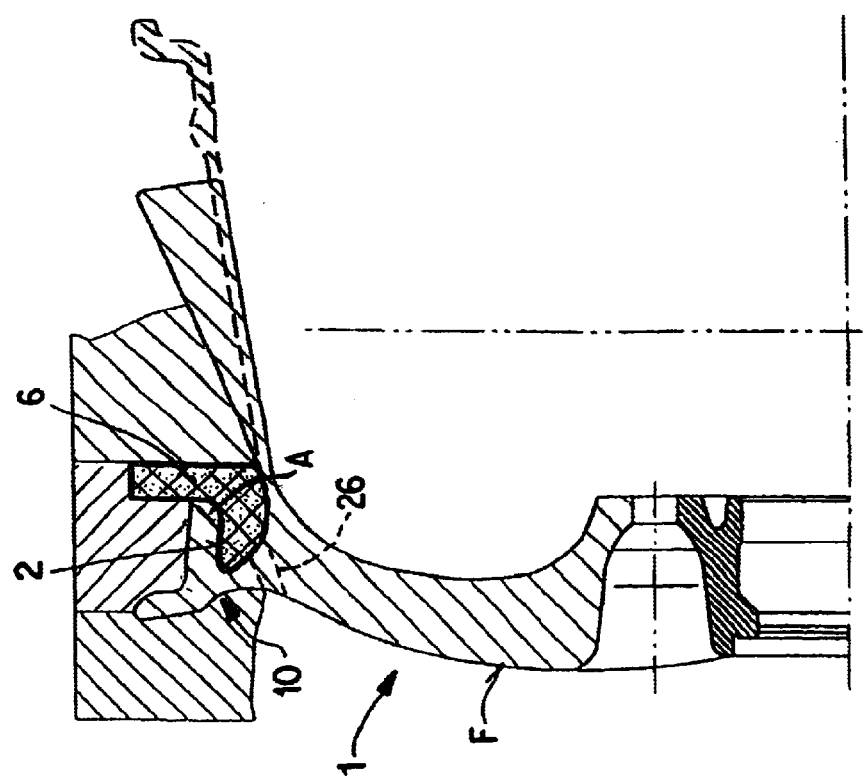
FIG. 7 shows a section of a wheel with a coreprint.

The cores should preferably be held via core prints 17; 20 in the molding tool, which extend toward the outside of the wheel 1, as shown as an example in FIG. 4. As shown in FIG. 7, the core 6 in the annular space opening toward an axial rear side has a receiving bore 26 for active valve running at least through the core printing of the core 6 as well as through a wall of said rim.

The core prints can also comprise several metallic pins 21, which extend like a pincushion distributed over the surface of the core and a core layer.

The core is provided as a metallic foam core, preferably with a coating or skin of this kind, which makes the metallic foam core resistant to the influences of the casting melt during the casting process. The surface of the coating or the outer skin can have a contoured surface structure, that is, according to the invention, the coating should have a specific roughness, so that an intimate connection exists between the casting material and the lost core.

Figure 5:
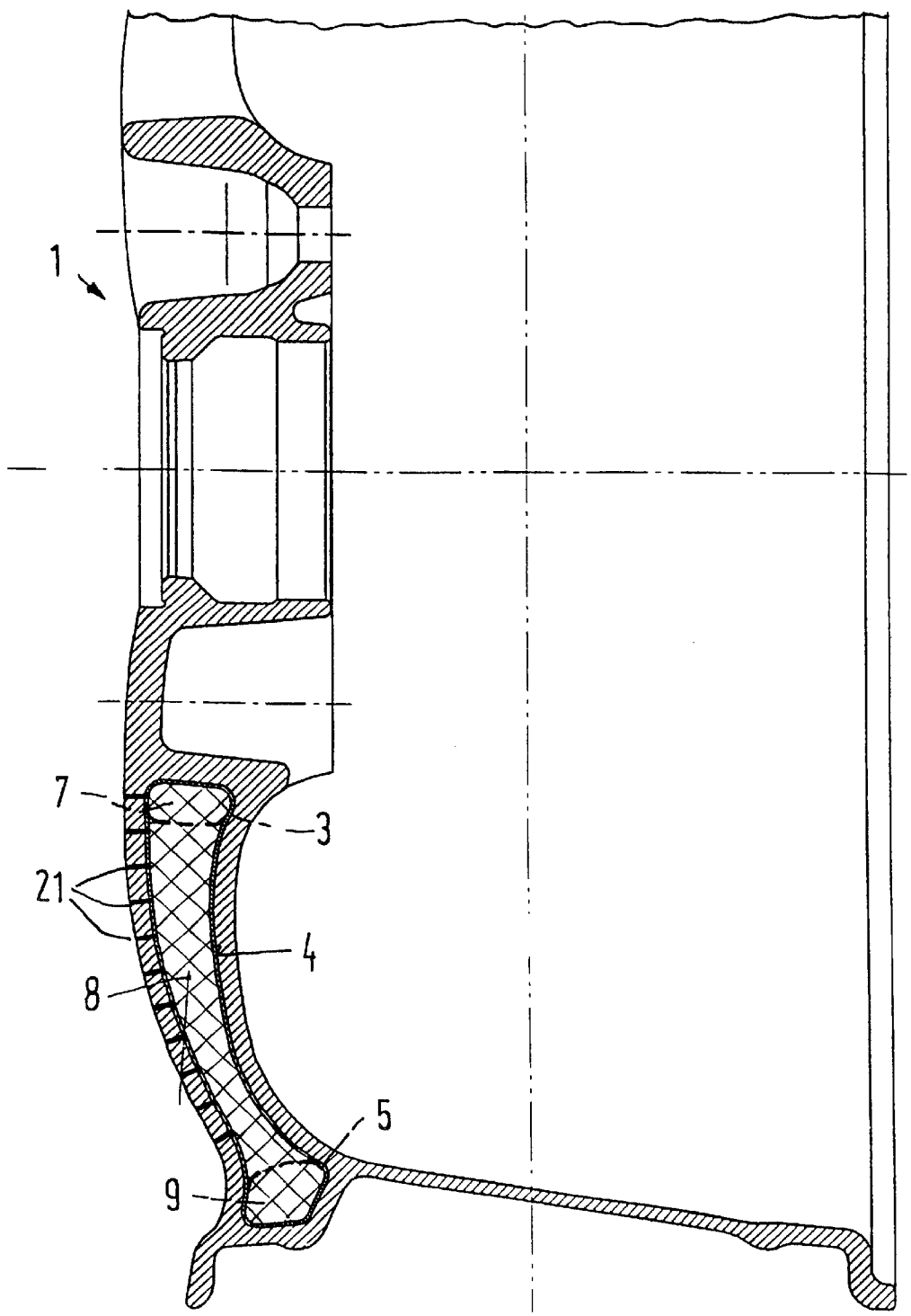
FIG. 5 shows a section of a wheel with core prints at the core configured as needle pins.

As shown in particular in FIG. 5, a wheel with hollow spokes in the hollow spaces 3, 4, and 5 has a corresponding core 7, 8, and 9. The core 9 according to FIG. 5 can consist of a core 6 according to FIGS. 1 and 2. This core 6 can also be used in a full casting rim.

The core 6 is provided in the one-sided open annular space 2 in the rim edge 10 between a rim spider F and a rim 15. For this purpose, a molding tool 11, 14 with two sliders 12, 13 is required. One of the sliders 12 has a cutout 12a, which is tightly closed by another slider 13. In this cutout 12a, a projecting core part 6a is arranged, which in the finished condition of the wheel 1 is turned off along the dotted line.

For a local reinforcement of the wheel, reinforcement elements, for example, metallic or ceramic continuous fiber elements, are provided at the core and/or at the mold, which are also encapsulated.

According to a special embodiment, the vehicle wheel can also be made of castable plastic such as thermoplast or a duroplast, wherein the core or cores can be used as in the wheel made of light metal material. According to the invention, in a plastic wheel, the cores can also be made of a corresponding temperature-resistant plastic foam or can be made of plastic hollow bodies in a shell structure. The plastic can be short-fiber reinforced or long-fiber reinforced, fabric or mat reinforced, wherein these reinforcements are correspondingly held at the core or at the mold.

What is claimed is:

1. A cast light metal wheel for a motor vehicle comprising a residual core made of a metallic material and arranged in at least one hollow space of the wheel, wherein the core in an area of a rim edge is arranged in an annular space at the rim edge of said wheel between a rim and a collar ring, and the annular space is open toward an axial rear side of the wheel and is arranged adjacent to said rim, and wherein the core or cores have core printings facing toward an axially outer side of the wheel for fixing in position a molding tool.

2. A wheel according to claim 1, wherein the core printings comprise several metallic pins and are arranged distributed over the surface of the core.

3. A wheel according to claim 1, wherein the surface of the core is configured as a contoured surface.

4. A wheel according to claim 1, wherein the core is made of metallic foam with a surrounding layer.

5. A wheel according to claim 1, wherein the wheel has local reinforcement elements, which are positioned at the core or in a mold for a casting process.

6. A cast light metal wheel for a motor vehicle comprising a residual core made of a metallic material and arranged in at least one hollow space of the wheel, wherein the core in an area of a rim edge is arranged in an annular space at the rim edge of said wheel between a rim and a collar ring, and the annular space is open toward an axial rear side of the wheel and is arranged adjacent to said rim, and wherein a receiving bore for a tire valve runs at least through one core printing of said core in said annular space of said rim edge as well as through a wall of said rim.

7. A wheel according to claim 6, wherein the core printings comprise several metallic pins and are arranged distributed over the surface of the core.

8. A cast light metal wheel for a motor vehicle comprising a residual core made of a metallic material and arranged in at least one hollow space of the wheel, wherein the core in an area of a rim edge is arranged in an annular space at the rim edge of said wheel between a rim and a collar ring, and the annular space is open toward an axial rear side of the wheel and is arranged adjacent to said rim, and wherein core printings comprise several metallic pins and are arranged distributed over the surface of the core.

9. A cast light metal wheel for a motor vehicle comprising a residual core made of a metallic material and arranged in at least one hollow space of the wheel, wherein the core in an area of a rim edge is arranged in an annular space at the rim edge of said wheel between a rim and a collar ring, and the annular space is open toward an axial rear side of the wheel and is arranged adjacent to said rim, and wherein the core comprises a metallic or ceramic shell-shaped hollow body.

10. A wheel according to claim 9, wherein the shell-shaped hollow body is filled with metallic foam.

11. A molding tool assembly for a cast light metal motor vehicle wheel which has a residual core made of a metallic material and arranged in at least one hollow space of the wheel, comprising:

a lower mold located axial outward, an upper mold located axial inward, sliders arranged for producing an annular space between a rim and a collar ring of the wheel with said core being arranged in the annular space in an area of a rim edge, said core having a core part extending from an open side of said annular space to an area between said sliders, said annular space being open toward an axial rear side of the wheel, and, a cutout for accommodating the core part of said core, wherein the sliders are arranged in order to be pulled out closely side by side in relation to the upper and lower molds, wherein a first of the sliders lies directly beside the lower mold and includes the cutout for the core, which projects out of said annular space, and wherein a second of the sliders tightly closes off said cutout and said annular space.

12. A molding tool assembly according to claim 11, wherein the rim is arranged in the molding tool as a roll-out casting between the lower mold and the second of the sliders.

13. A molding tool assembly according to claim 11, wherein the core has core prints facing outward from the wheel for fixing the core in position in the molding tool.

14. A molding tool assembly according to claim 13, wherein the core prints are made of several metal pins and are arranged distributed over the surfaces of the core.

15. A molding tool assembly according to claim 11, wherein a receiving core for a wheel valve runs through at least one core print of said core in said annular space of said rim edges as well as through a wall of the rim.

16. A method of making a cast wheel for a motor vehicle having a residual core located in at least one hollow space of the wheel, comprising:

providing a molding tool with sliders which are arranged in order to be pulled out closely side by side in connection with a lower mold and an upper mold, and arranging the core in an area of a rim edge in an annular space between a rim and a collar ring, said annular space being open toward an axial rear side of the wheel, wherein a first of the sliders lying adjacent the lower mold has a cutout for a portion of the core which projects out of the annular space, and wherein a second of the sliders tightly closes off the cutout and the annular space.

17. A method according to claim 16, wherein the rim is arranged in the molding tool as a roll-out casting between the lower mold and the second of the sliders.

* * * * *